US007471894B2

(12) United States Patent
Ito et al.

(10) Patent No.: US 7,471,894 B2

(45) Date of Patent: Dec. 30, 2008

(54) MANUFACTURING METHOD OF COLOR CATHODE RAY TUBE

(75) Inventors: Yoichi Ito, Mobara (JP); Satoshi Muto, Mobara (JP)

(73) Assignee: Hitachi Displays, Ltd., Mobara-shi (JP)

(*) Notice: Subject to any disclaimer, the term of this patent is extended or adjusted under 35 U.S.C. 154(b) by 321 days.

(21) Appl. No.: 11/340,560

(22) Filed: Jan. 27, 2006

(65) Prior Publication Data

US 2006/0171709 A1 Aug. 3, 2006

(30) Foreign Application Priority Data

Jan. 28, 2005 (JP) ............................ 2005-020696

(51) Int. Cl.
*G03B 41/00* (2006.01)

(52) U.S. Cl. ........................................ 396/546; 445/47

(58) Field of Classification Search ................. 396/546; 313/364, 402; 445/47

See application file for complete search history.

(56) References Cited

U.S. PATENT DOCUMENTS

| | | | | |
|---|---|---|---|---|
| 6,091,191 | A * | 7/2000 | Togawa | 313/402 |
| 2005/0104494 | A1* | 5/2005 | Yotani et al. | 313/2.1 |

* cited by examiner

*Primary Examiner*—Patrick J Assouad
*Assistant Examiner*—Autumn Parker
(74) *Attorney, Agent, or Firm*—Antonelli, Terry, Stout & Kraus, LLP.

(57) ABSTRACT

A correction filter used in the exposure for forming a phosphor screen includes three kinds of correction filters consisting of a grading filter, a monochroic local correction filter and a multi-color local correction filter. With the use of three kinds of correction filters, it is possible to improve the whiteness uniformity which may be degraded due to the wall thickness difference at the center and a peripheral portion of a panel portion of a flat-face-type color cathode ray tube.

8 Claims, 8 Drawing Sheets

MANUFACTURING METHOD OF COLOR CATHODE RAY TUBE

BACKGROUND OF THE INVENTION

1. Field of the Invention

The present invention relates to the manufacture of a color cathode ray tube, and more particularly to a manufacturing method of a flat-face type color cathode ray tube having a black matrix film which is constituted of phosphor pixels and a light absorbing substance layer surrounding the phosphor pixels on an inner surface of a panel portion thereof.

2. Description of the Related Art

A color cathode ray tube, for example, a color cathode ray tube which is used in a color television set, a color display monitor for an OA (Office Automation) equipment terminal includes a vacuum envelope. The vacuum envelope is constituted of an approximately rectangular panel portion which has a phosphor screen including a black matrix (BM) film or a large number of dot-like or stripe-like phosphor pixels on an inner surface thereof, an approximately cylindrical-shape neck portion which houses an electron gun therein, and an approximately funnel-like funnel portion which connects the neck portion and the above-mentioned panel portion on an axis which is substantially coaxial with a tube axis and includes a deflection yoke on an outer periphery of a transitional region between the neck portion and the panel portion. Further, in the inside of the vacuum envelope, a shadow mask which constitutes a color selection electrode and includes a large number of electron beam passing apertures is arranged in the vicinity of the phosphor screen in an opposed manner.

The above-mentioned shadow mask uses an aluminum killed steel as a main constituting material thereof Further, with respect to the shadow mask, along with a recent demand for high definition of the color cathode ray tube, a shadow mask having a small plate thickness has been used. In a color cathode ray tube which adopts the small-plate-thickness shadow mask, a phenomenon in which a portion of the shadow mask is deformed by heat so that an electron beam spot is displaced from a given position on a phosphor surface during a displaying operation, that is, a so-called mask doming phenomenon is liable to easily occur. As a means to cope with such a phenomenon, along with the improvement of a shadow mask suspension mechanism, a material of INVAR, which is a material of FeNi36, is also used as the constitutional material in view of the thermal expansion coefficient and the physical hardness.

Such a shadow mask is formed as follows. A form in which a large number of electron beam passing apertures are formed at given positions by etching is blanked in a given shape. Thereafter, the blanked form is formed into a shape using a press such that the shadow mask is constituted of an approximately spherical main surface and a skirt portion which is contiguously formed with a periphery of the main surface and is bent by approximately 90 degrees with respect to the main surface and is used.

Further, recently, along with the popularization of a color television set or a color display monitor having a flat screen type, there is observed a tendency that an outer surface of a faceplate (panel glass) is leveled or flattened with respect to the color cathode ray tube which is used in the color television set and the color display monitor.

FIG. 11 is a schematic cross-sectional view for explaining a constitutional example of a shadow-mask-type color cathode ray tube of a flat face type. In FIG. 11, a vacuum envelope is constituted of a panel portion 51 which forms a phosphor screen 50 having a black matrix film which consists of phosphor pixels and a non-light-emitting light absorbing material layer on an inner surface thereof, a neck portion 52 which houses an electron gun 61, and a funnel portion 53 which connects the panel portion 51 and the neck portion 52.

The panel portion 51 includes an approximately flat outer surface and a concavely curved inner surface. The phosphor screen 50 which is arranged on the inner surface of the panel portion 51 includes, in general, phosphor pixels which are formed by applying phosphors of three colors of red (R), green (G), blue (B) respectively in a dotted pattern or in a stripe pattern, a black matrix film which surrounds the phosphor pixels and is formed of a non-light-emitting light absorption material layer made of carbon, and a metal reflection film which constitutes a metal back layer. Further, a shadow mask 54 is arranged close to the phosphor screen 50. The shadow mask 54 is formed of INVAR material by taking a thermal expansion coefficient and a physical hardness into consideration.

The shadow mask 54 is of a self-standing shape-holding type which is formed by a press, wherein a periphery of the shadow mask 54 is welded to a mask frame 57, and the shadow mask 54 is suspended and supported on stud pins 60 which are mounted upright on an inner wall of a skirt portion of the panel portion 51 by way of suspension springs 59. Here, a magnetic shield 58 is fixed to an electron-gun-61-side of the mask frame 57. A deflection yoke 55 is exteriorly mounted on a transitional region between the neck portion 52 and the funnel portion 53 of the vacuum envelope, wherein by deflecting three modified electron beams B which are irradiated from the electron gun 61 in the horizontal direction (X direction) and the vertical direction (Y direction), the electron beams B are scanned two-dimensionally on the phosphor screen 50 thus reproducing the image.

Further, an inner conductive film 62 which is formed on an inner surface of the funnel portion 53 applies a high voltage introduced from an anode button to electrodes which form a main lens of an electron gun 61 and a metal reflection film of the phosphor screen 50. Numeral 63 indicates a reinforcing band, numeral 64 indicates a mouthpiece, and numeral 65 indicates a whole color cathode ray tube.

In the color cathode ray tube having such a constitution, as described previously, the panel portion 51 has the approximately flat outer surface and the concavely curved inner surface. To the contrary, the shadow mask 54 is shaped into the given curved surface by molding the shadow mask form using a press and is curved in conformity with the inner surface of the panel portion 51.

The reason the inner surface of the panel portion 51 and the shadow mask 54 are curved irrespective of the approximately flat external surface of the panel portion 51 is that the manufacturing method of the shadow mask 54 by a press forming technique can be performed easily and at a low cost.

The curved shape of the shadow mask 54 is an aspherical shape in which radii of curvature are gradually decreased from the center of a main surface to a periphery of the shadow mask 54 respectively along a long axis, a short axis and a diagonal line of the shadow mask 54 respectively. The curvatures of the shadow mask 54 of the aspherical shape are determined as follows, for example, wherein an equivalent radius of curvature is set as Re. That is:

$$Re=(z^2+e^2)/2z$$

Here, e: a distance (mm) in the direction orthogonal to a tube axis from the center to an arbitrary peripheral position on a main surface of the shadow mask z: a falling quantity (mm) in the tube axis direction from the center of the main surface of the shadow mask at the above-mentioned arbitrary peripheral position Such specification establishes the compatibility between a flat feeling of the screen and the maintenance of a mechanical strength of the shaped shadow mask in the color cathode ray tube FIG. 12 is a schematic cross-sectional view showing a portion of an essential part of the color cathode ray tube shown in FIG. 11 in an enlarged manner. In FIG. 12, The phosphor screen 50 formed on the inner surface of the panel portion 51 includes three-color phosphor pixels 501 which are formed by applying phosphors of three colors in a dotted pattern or a stripe pattern, a black matrix film 502 which surrounds the phosphor pixels 501, and a metal reflection film 503, wherein the shadow mask 54 is arranged close to the phosphor screen 50 in a state that the shadow mask 54 faces the phosphor screen 50 in an opposed manner.

The three-color phosphor pixels 501 are constituted of a red (R) phosphor pixel 501R, a green (G) phosphor pixel 501G and a blue (B) phosphor pixel 501B. The phosphor pixels 501 are formed on opening portions (window portions) formed in the black matrix film 502 through an exposure step after applying a phosphor slurry on an inner surface of the panel portion on which the black matrix film 502 is formed. The exposure step is performed for every color. Since positions of three light sources 66G, 66B, 66R are different from each other, it is possible to accurately form three kinds of phosphor pixels on the opening portions (window portions) formed in the black matrix film 502 respectively.

One example of a conventional exposure device which is used for forming such a phosphor screen is shown in FIG. 13. The exposure device shown in FIG. 13 is an exposure device which is disclosed in FIG. 1 of patent document 1, that is, patent publication number JP-A-8-185798. In FIG. 13, numeral 1 indicates a spot light source, numeral 2 indicates a correction lens, numeral 3 indicates a light control filter, numeral 4 indicates a shadow mask, numeral 5 indicates a panel, numeral 6 indicates guide poles, numeral 7 indicates an XYθ table, numeral 8 indicates a position adjusting mechanism, and numeral 9 indicates a light control filter mounting plate. In forming respective BMs for blue, red and green using such an exposure device, the exposure is performed by displacing the position of the spot light source 1. Accordingly, the exposure is performed by preliminarily moving and setting the light control filter 3 to a position where the difference among the respective BM diameters becomes optimum. Patent document 1 discloses that since the BMs for three primary colors are formed using the same light control filter 3 in the above-mentioned manner, it is possible to prevent the generation of BM diameter difference attributed to the irregularities of the light control filter 3 as a finished product.

Further, FIG. 14 is a schematic view showing a conventional exposure method for forming a phosphor screen and is disclosed in FIG. 1 of patent document 2, that is, patent publication number JP-A-7-122184. In FIG. 14, light from an exposure light source 36 passes a group of lenses 35, the light which passes the group of lenses 35 is irradiated to an inner surface of a panel glass 32 of a cathode ray tube, thus performing the exposure for forming a phosphor screen 34 of the cathode ray tube. Here, the light transmissivity of a peripheral region of at least one lens or filter which is included in the group of lenses 35 is set higher than the light transmissivity of a center region of the lens or the filter thus making the intensity distribution of exposure light on the peripheral region with respect to the center region of the panel portion appropriate.

Patent document 2 discloses that with the use of such method and exposure device, even on an inner surface of a panel glass which is used in a cathode ray tube having an ultra wide angle, it is possible to form a phosphor screen pattern at an accurate width and pitch.

In the flat panel type color cathode ray tube shown in FIG. 11 in which the panel portion has the approximately flat outer surface, a wall thickness of the panel portion differs between a center portion and a peripheral portion. Due to such difference in thickness, there has been a drawback that the difference arises among the brightness of three colors thus giving rise to a possibility that the white uniformity is deteriorated. To cope with such a drawback, it is necessary to correct only a BM width of one color.

In such a case, it is necessary to prepare grading filters which differ in transmissivity. However, as described in patent documents 1 and 2, the grading filter such as the light control filter 3 or a CAD (Computer Aided Design) filter 42 has the specification common in three colors and hence, it is difficult to exchange the grading filter in the midst of the exposure. As a compensating means to overcome such difficulty, the exposure may be performed by combining the grading filter and a local adjusting filter so as to adjust the above-mentioned BM width. However, when the above-mentioned local adjusting filter is added, due to the mutual interference of both filters, it is hardly possible to obtain a desired phosphor screen.

SUMMARY OF THE INVENTION

To overcome the above-mentioned drawbacks, according to the present invention, a correction filter is formed by combining a grading filter, a three-color common local correction filter and single-color local correction filters. Further, the exposure is performed by displacing the correction filter and an exposure light source for every exposure step.

According to the present invention, it is possible to obtain outstanding advantageous effects including the acquisition of a high-quality color cathode ray tube which can suppress the interference between mutual filters, the acquisition of a high-quality color cathode ray tube which can simultaneously achieve the three-color common correction and the color separation correction while obtaining a BM film and phosphor pixels of desired sizes over a whole phosphor screen, and the acquisition of a high-quality color cathode ray tube which can obtain a BM film and phosphor pixels having desired sizes over a whole phosphor screen.

Further, according to the present invention, it is possible to obtain outstanding advantageous effects including the proper correction of the whole inner surface of the panel, the acquisition of the BM film and the phosphor pixels having desired sizes over the whole phosphor screen, the easy centering of three kinds of exposures, the suppression of fluctuation of sizes of the BM film and the phosphor pixels, the proper correction of the panel peripheral portion, and the desired correction over the whole phosphor screen.

Further, according to the present invention, it is possible to properly perform the centering in three kinds of exposures by specifying the relative displacement quantities and hence, the fluctuation of sizes of the BM film and the phosphor pixels can be suppressed and, at the same time, the interference between mutual films can be suppressed whereby it is possible to obtain the BM film and the phosphor pixels having desired sizes over the whole phosphor screen thus enabling the acquisition of the high-quality color cathode ray tube.

Further, according to the present invention, it is possible to provide a high-quality color cathode ray tube which can simultaneously achieve the three-color common correction and the color separation correction, can obtain the BM film and the phosphor pixels having the desired sizes over the whole phosphor screen, can suppress the interference between the mutual filters, can obtain the BM film and the phosphor pixels having the desired sizes over the whole phosphor screen, can properly perform the correction of the whole inner surface of the panel and can obtain the BM film and the phosphor pixels having the desired sizes over the whole phosphor screen.

BRIEF DESCRIPTION OF DRAWINGS

FIG. 4A, FIG. 4B and FIG. 4C are views showing an example of a monochroic local correction filter in the embodiment 1 of the present invention, wherein FIG. 4A and FIG. 4C are schematic plan views of the local correction filters for side beams and FIG. 4B is a schematic plan view of the local correction filter for center beams;

DESCRIPTION OF THE PREFERRED EMBODIMENTS

Hereinafter, preferred embodiments of the present invention are explained in detail in conjunction with drawings which show the embodiments.

A first embodiment relates to a manufacturing method of a cathode ray tube which performs the exposure after moving a grading filter in the Z direction.

The embodiment explained hereinafter is directed to a manufacturing method of a color cathode ray tube comprising a panel portion which includes a phosphor screen on which a black matrix film having a plurality of opening portions and three kinds of phosphor pixels which are arranged in the opening portions of the black matrix film are formed on an inner surface thereof, and a shadow mask which is arranged to face the phosphor screen formed on the inner surface of the panel portion and includes a large number of electron beam passing apertures.

A step for forming the black matrix film comprises an exposure step of first phosphor pixel holes, an exposure step of second phosphor pixel holes, and an exposure step of third phosphor pixel holes. The exposure step of the first phosphor pixel holes performs the exposure by arranging a grading filter between the inner surface of the panel portion and an exposure light source with a first distance B1G spaced apart from the exposure light source. The exposure step of the second phosphor pixel holes performs the exposure by arranging the grading filter between the inner surface of the panel portion and the exposure light source with a second distance B1B spaced apart from the exposure light source. The exposure step of the third phosphor pixel holes performs the exposure by arranging the grading filter between the inner surface of the panel portion and the exposure light source with a third distance B1R spaced apart from the exposure light source. Here, the third distance B1R differs from the first distance B1G or the second distance B1B.

Holes for green phosphor pixels are exposed in the exposure step of first phosphor pixel holes, holes for blue phosphor pixels are exposed in the exposure step of second phosphor pixel holes, and holes for red phosphor pixels are exposed in the exposure step of third phosphor pixel holes.

Embodiment 1

Figure 1:
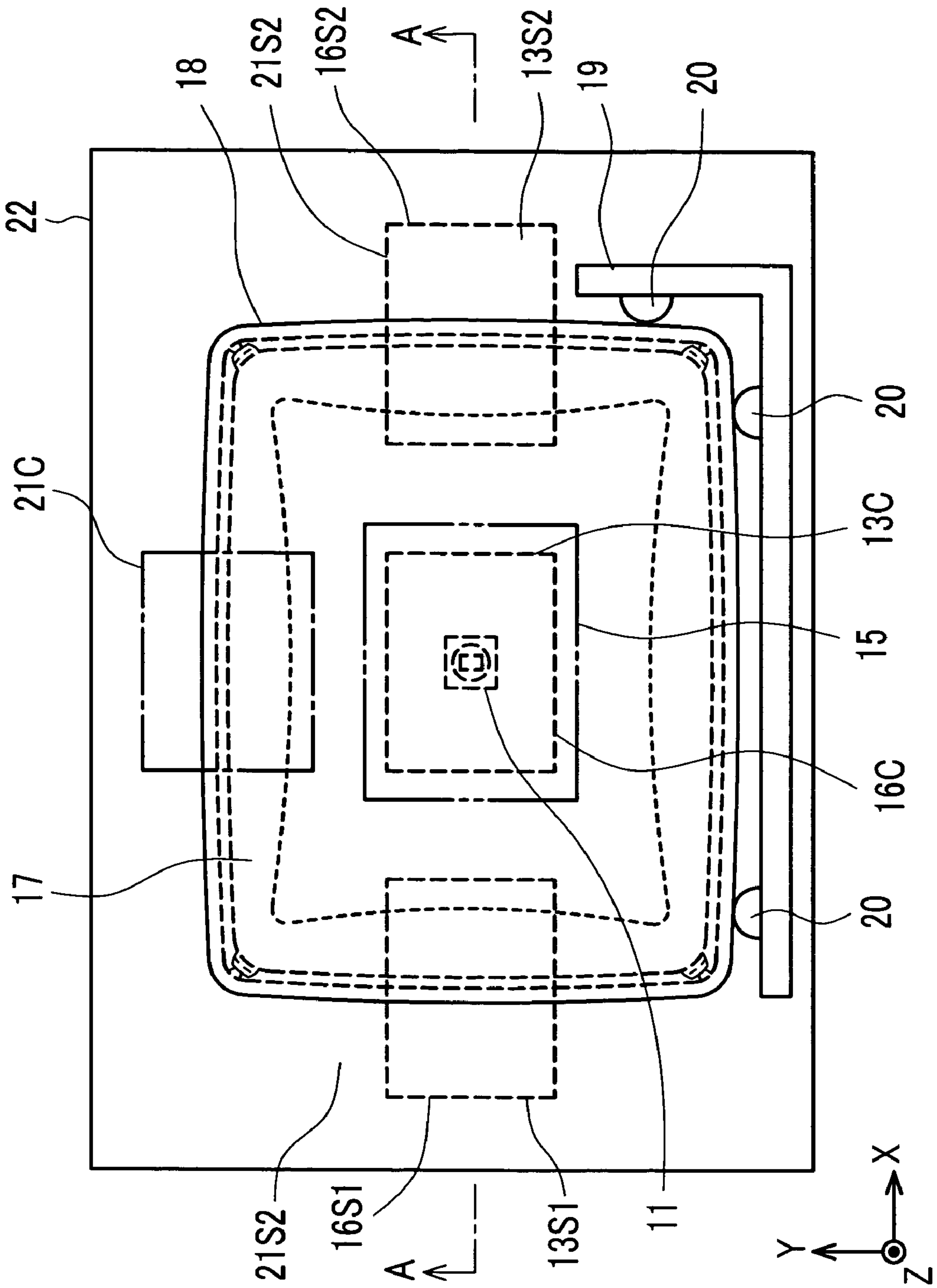
FIG. 1 is a schematic plan view showing an example of an exposure device for explaining an embodiment 1 of a method for manufacturing a color cathode ray tube according to the present invention.
Figure 2:
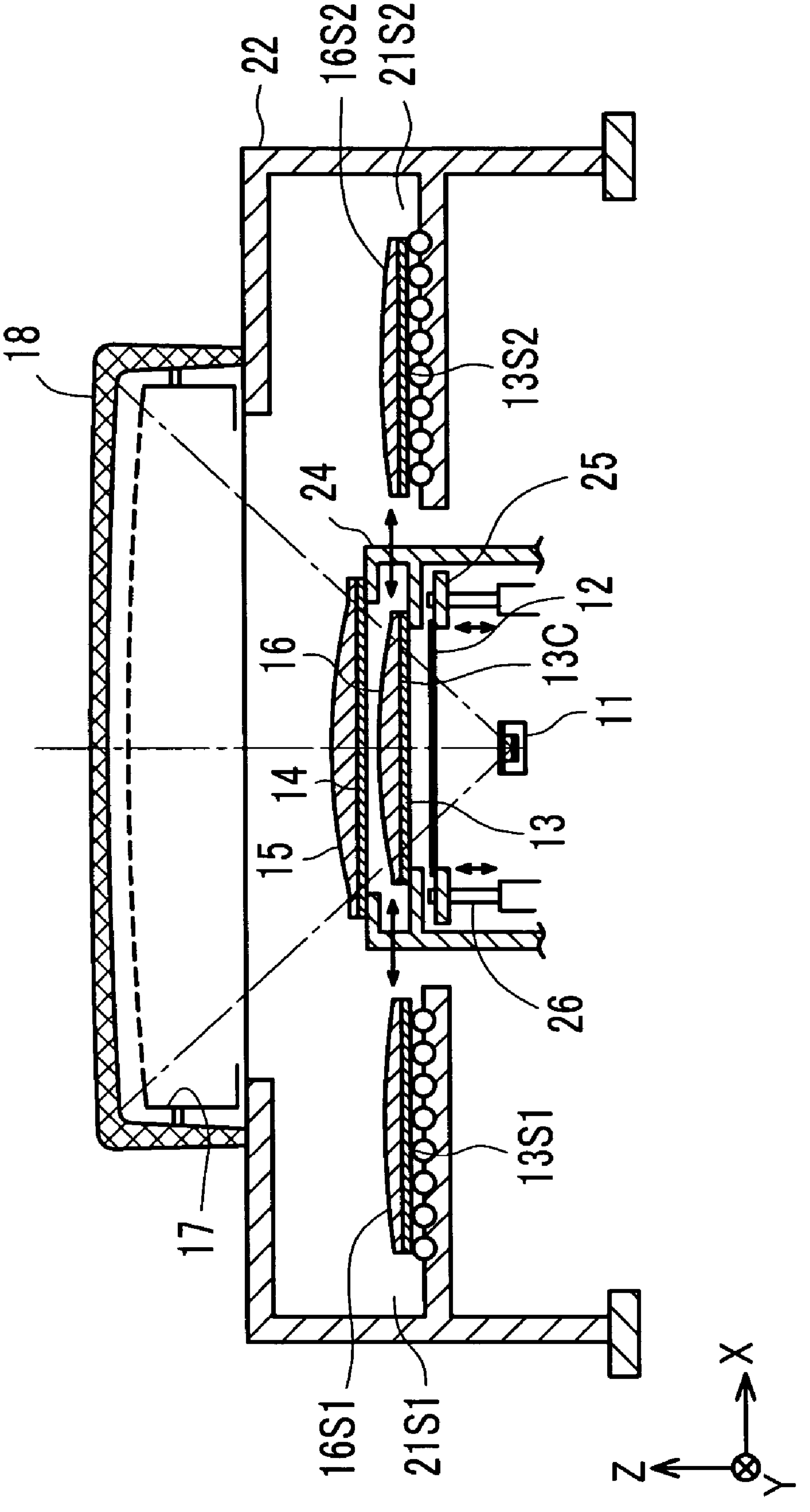
FIG. 2 is a cross-sectional view taken along a line A-A in FIG. 1.

FIG. 1 and FIG. 2 are views for explaining an embodiment 1 of a manufacturing method of a color cathode ray tube of the present invention, wherein FIG. 1 is a schematic plan view showing an example of an exposure device and FIG. 2 is a cross-sectional view taken along a line A-A in FIG. 1. In FIG. 1 and FIG. 2, numeral 11 indicates an exposure light source, numeral 12 indicates a grading filter, numeral 13C indicates a center-beam local correction filter, numeral 13S1 indicates a first side-beam local correction filter, and numeral 13S2 indicates a second side-beam local correction filter, wherein these local correction filters are collectively referred to as a monochroic local correction filter 13. Numeral 14 indicates a multi-color local correction filter, numeral 15 indicates a first correction lens, numeral 16C indicates a center-beam second correction lens, numeral 16S1 indicates a first side-beam second correction lens, and numeral 16S2 indicates a second side-beam second correction lens, wherein a group of these second correction lenses is collectively referred to as a second correction lens 16. Numeral 17 indicates a shadow mask, numeral 18 indicates a panel portion, numeral 19 indicates a panel positioning jig, numeral 20 indicates projections, numeral 21 indicates a storing chamber, and numeral 22 indicates a device body.

Here, although the multi-color local correction filter 14 and the first correction lens 15 are manufactured as separate parts, these parts are arranged in an overlapped manner on the same arrangement base at the time of performing the exposure. Further, although the monochroic local correction filter 13 and the second correction lens 16 are manufactured as separate parts, these parts are moved together at the time of performing the exposure.

Further, numeral 24 indicates a mounting base on which lenses and filters are mounted, numeral 25 indicates a grading filter mounting base on which the grading filter 12 is mounted, and numeral 26 indicates guide poles for guiding the grading filter mounting base 25 in the Z direction.

The grading filter mounting base on which the grading filter 12 is mounted can be moved in the Z direction by a drive mechanism not shown in the drawing. At the time of performing the exposure, the position of the grading filter 12 assumes a fixed state.

The grading filter 12 exhibits the low optical transmissivity at a center portion thereof and increases the optical transmissivity in the direction toward a periphery thereof. When the grading filter 12 is changed in the Z direction, the change of optical transmissivity at the peripheral portion thereof is increased and the change of the optical transmissivity at the center portion is small. When the grading filter 12 is arranged at a position close to the light source 11, light which is irradiated to the center portion of the panel portion 18 passes a portion of the grading filter which exhibits the low optical transmissivity, and light which is irradiated to the peripheral portion of the panel portion 18 also passes a portion of the grading filter 12 which exhibits the low optical transmissivity. Accordingly, an exposure quantity is small also in the peripheral portion of the panel portion 18.

On the other hand, when the grading filter 12 is arranged at a position remote from the light source 11, the light irradiated to the center portion of the panel portion 18 passes a portion of the grading filter which exhibits the low optical transmissivity, and the light which is irradiated to the peripheral portion of the panel portion 18 passes a portion of the grading filter 12 which exhibits the high optical transmissivity. Accordingly, the exposure quantity is large in the peripheral portion of the panel portion 18. Accordingly, by adjusting the sensitivity of a developer which is applied to the inner surface of the panel portion 18 and an exposure time, it is possible to change the diameter of BM holes formed in the peripheral portion of the panel portion 18 using one grading filter.

By allowing the grading filter 12 to be independently adjustable in the vertical direction, it is possible to easily adjust the exposure quantity in the peripheral portion of the panel portion 18. Since the exposure quantity in the peripheral portion of the panel portion 18 can be adjusted using one grading filter, it is possible to adjust the diameter of BM holes in the peripheral portion of the panel portion 18 without changing the grading filter for every exposure. Further, by changing a change ratio of the diameter of BM holes for every BM holes for each color, it is also possible to suppress the degradation of the white uniformity. At the center portion of the panel portion 18, even when the position of the grading filter 12 is changed in the Z direction, the change of the exposure quantity for respective holes is small.

Using such an exposure device, the flat-face-type panel portion 18 which has an approximately flat outer surface and allows the peripheral portion thereof to have a larger wall thickness compared to the center portion thereof is, in a state that the shadow mask 17 is mounted on the inner side of the panel portion 18, mounted on the device body 22 by being brought into contact with projections 20 of the panel positioning jig 19. Due to such a constitution, a phosphor screen which is exposed by light beams from the exposure light source 11 and possesses a given pattern is formed.

In this embodiment, in performing such exposure, the grading filter 12 in common among three colors which changes the optical transmissivity between the center and the periphery as the correction filter, the monochroic local correction filter 13 for respective colors for correcting at a fixed transmissivity, and the multi-color local correction filter 14 in common among three colors for correcting at a fixed transmissivity are interposed, and these filters are combined with a plurality of correction lenses to perform the exposure thus forming a desired pattern.

The monochroic local correction filters 13 for respective colors are constituted of a center-beam local correction filter 13C and both side-beam local correction filters 13S1, 13S2 and are respectively used in combination with the position of the exposure light source 11. That is, in the center-beam exposure, the center-beam local correction filter 13C which is retracted in a storing chamber 21C in the Y-axis direction is moved to a given position in the vicinity of a tube axis from the retracting position. After the movement, the exposure is made by combining the center-beam local correction filter 13C with the grading filter 12 and the multi-color local correction filter 14 which are preliminarily arranged to a given position in the vicinity of a tube axis. After the completion of the exposure, the center-beam local correction filter 13C is retracted and stored in the storing chamber 21C and stands by in the storing chamber 21C.

On the other hand, both side-beam local correction filters 13S1, 13S2 are also respectively moved to the given position in the vicinity of the tube axis from the respective storing chambers 21S1, 21S2 at the time of performing the side-beam exposure. After the movement, the exposure is made by combining the side-beam local correction filters 13S1, 13S2 with the grading filter 12 and the multi-color local correction filter 14 which are preliminarily arranged in place in the vicinity of the tube axis. After the completion of the exposure, the side-beam local correction filters 13S1, 13S2 are respectively retracted and stored in the storing chambers 21S1, 21S2 and stand by in the storing chambers 21S1, 21S2. In performing the respective exposures, the light source position is displaced in the X direction. Further, when the BM holes are formed in a stripe shape, the exposure is made while moving the light source in the Y direction.

Figure 3:
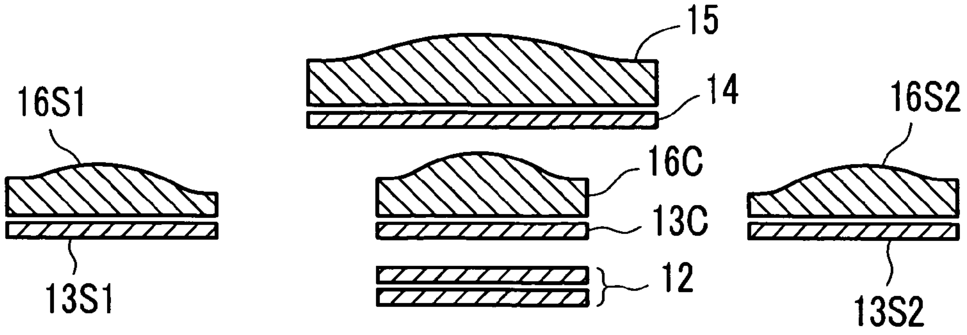
FIG. 3 is a schematic cross-sectional view showing an example of the combined constitution of a correction lens and a correction filter in the embodiment 1 of the present invention.
Figure 4A:
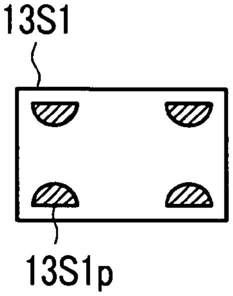
Figure 4B:
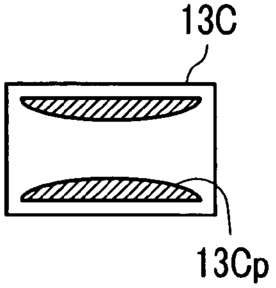
Figure 4C:
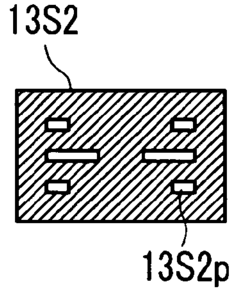
Figure 5:
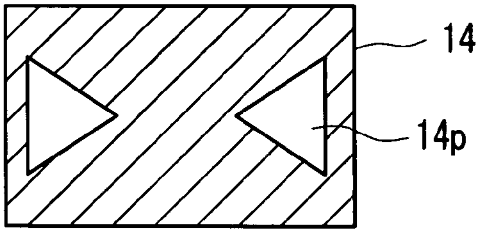
FIG. 5 is a schematic plan view showing an example of a multi-color local correction filter in the embodiment 1 of the present invention.
Figure 6:
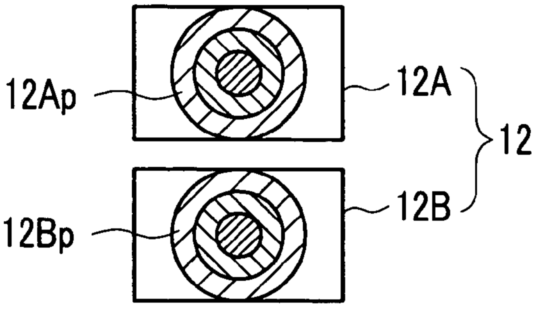
FIG. 6 is a schematic plan view showing an example of a grading filter in the embodiment 1 of the present invention.

FIG. 3 to FIG. 6 show examples of the correction lens and the correction filter used in the embodiment 1 of the method for manufacturing the color cathode ray tube of the present invention, wherein FIG. 3 is a schematic cross-sectional view showing one example of the combined constitution of the correction lenses and the correction filters. FIG. 4A, FIG. 4B, and FIG. 4C are views showing a monochroic local correction filters, wherein FIG. 4A and FIG. 4C are schematic plan views of the local correction filters for side beams and FIG. 4B is a schematic plan view of the local correction filter for center beams. FIG. 5 is a schematic plan view showing a multi-color local correction filter. FIG. 6 is a schematic plan view of a grading filter. In these respective views, parts identical with the parts shown in the above-mentioned drawings are given the same symbols.

Then, the exposure step for forming the BM holes is explained. First of all, the exposure for forming the BM holes for green phosphor is performed. The multi-color local correction filter 14, the first correction lens 15, the center-beam local correction filter 13C, the second correction lens 16 and the grading filter 12 are respectively arranged at given positions, and the panel portion 18 which mounts the shadow mask 17 thereon is mounted on the exposure base 22 and, thereafter, the exposure is performed.

Next, the exposure for forming the BM hole for blue phosphor is performed. The light source 11 is moved in the X direction, the center-beam local correction filter 13C and the second correction lens 16 for center beams are retracted from the mounting base 24, and first-side-beam local correction filter 13S1 and the first-side-beam second correction lens 16S1 are mounted on the mounting base 24 and, then, the exposure is performed.

Next, the exposure for forming the BM hole for red phosphor is performed. The light source 11 is moved in the X direction, the first side-beam local correction filter 13S1 and the first-side-beam second correction lens 16S1 are retracted from the mounting base 24, the second-side-beam local correction filter 13S2 and the second-side-beam second correction lens 16S2 are mounted on the mounting base 24, the grading filter 12 is moved to the panel side, and the exposure is performed.

By performing the exposure in this manner, it is possible to largely form the red BM holes in the peripheral portion of the panel portion 18.

In FIG. 3, the grading filter 12, the multi-color local correction filter 14 and the first correction lens 15 are coaxially arranged, and depending on the respective exposures for center beams and side beams, any one of the monochroic local correction filters 13 and any one of the second correction lenses 16 which forms a pair with a monochroic local correction filter 13 are selected.

FIG. 4A, FIG. 4B and FIG. 4C indicate examples of the correction pattern of the local correction filter 13, wherein FIG. 4A shows the example in which the side-beam local correction filter 13S1 adopts a half-moon-shaped pattern 13S1*p*, and another side-beam local correction filter 13S2 shown in FIG. 4C adopts a rectangular pattern 13S2*p*.

FIG. 5 shows an example of a correction pattern of the multi-color local correction filter 14, wherein the multi-color local correction filter 14 adopts a triangular pattern 14*p* having high transmissivity at both ends thereof in the X direction.

FIG. 6 shows an example of the correction pattern of the grading filter 12. The grading filter 12 exhibits the lowest optical transmissivity at a center portion thereof and gradually increases the optical transmissivity in the direction toward a peripheral portion thereof. The grading filter 12 is constituted of two grading filters, that is, a first grading filter 12A and a second grading filter 12B having approximately concentric patterns 12Ap, 12Bp.

According to the constitution of this embodiment 1, since the correction filter is formed by combining the grading filter 12, the monochroic local correction filters 13 and the multi-color local correction filter 14, it is possible to simultaneously realize the three-color common correction and the single-color individual corrections thus enabling the manufacture of a color cathode ray tube which exhibits the excellent white uniformity while eliminating difference in emitted brightness among three colors.

Embodiment 2

In the manufacturing method of the embodiment 2, the exposure is performed after moving the grading filter in the Z direction. This embodiment is directed to the manufacturing method of a color cathode ray tube which includes a panel portion which forms a phosphor screen having a black matrix film provided with a plurality of opening portions and three kinds of phosphor pixels which are arranged on the opening portions of the black matrix film on an inner surface thereof, and a shadow mask which is arranged to face the phosphor screen on the inner surface of the panel portion and has a large number of electron beam passing apertures.

A step for forming the black matrix film includes an exposure step of first phosphor pixel holes, an exposure step of second phosphor pixel holes, and an exposure step of third phosphor pixel holes. The exposure step of the first phosphor pixel holes performs the exposure by arranging the center of an exposure light source on a panel axis which passes a center portion of a panel perpendicular to a panel surface and by arranging a correction lens and a grading filter between the panel and the exposure light source. In the exposure step of the second phosphor pixel holes and the exposure step of the third phosphor pixel holes, the center of the exposure light source is displaced from the panel axis in the horizontal direction.

Further, assuming a distance between the panel axis and the center of the exposure light source as S, a distance between the panel axis and the center of the correction lens or the center of the grading filter as D, a distance between the panel portion and the exposure light source when the exposure light source is arranged on the panel axis as L, and a distance between the center of the light source and the correction lens or the grading filter as B, a following relationship is established.

$$D=S\times(L-B)/L$$

Further, a step for forming the black matrix film includes an exposure step of first phosphor pixel holes, an exposure step of second phosphor pixel holes, and an exposure step of third phosphor pixel holes. In the exposure step of the first phosphor pixel holes, the exposure step of the second phosphor pixel holes, and the step of the third phosphor pixel holes, the grading filter and the multi-color local correction filter are arranged between the panel and the exposure light source. The position of the exposure light source differs in the X-axis direction for every exposure step, and the center position of the grading filter and the center position of the multi-color local correction filter in each exposure step are arranged on a line which connects the center of the inner surface of the panel and the center of the light source. Here, the panel portion has a long axis in the X-axis direction and a short axis in the Y-axis direction.

Further, in the exposure step of the first phosphor pixel holes, the first phosphor pixel local correction filter is arranged between the panel and the exposure light source, and the center position of the first phosphor pixel local correction filter is arranged on a line which connects the center of the inner surface of the panel and the center of the light source.

Further, in the exposure step of the second phosphor pixel holes, the second phosphor pixel local correction filter is arranged between the panel and the exposure light source, and the center position of the second phosphor pixel local correction filter is arranged on a line which connects the center of the inner surface of the panel and the center of the light source.

Further, in the exposure step of the third phosphor pixel holes, the third phosphor pixel local correction filter is arranged between the panel and the exposure light source, and the center position of the third phosphor pixel local correction filter is arranged on a line which connects the center of the inner surface of the panel and the center of the light source.

Figure 7:
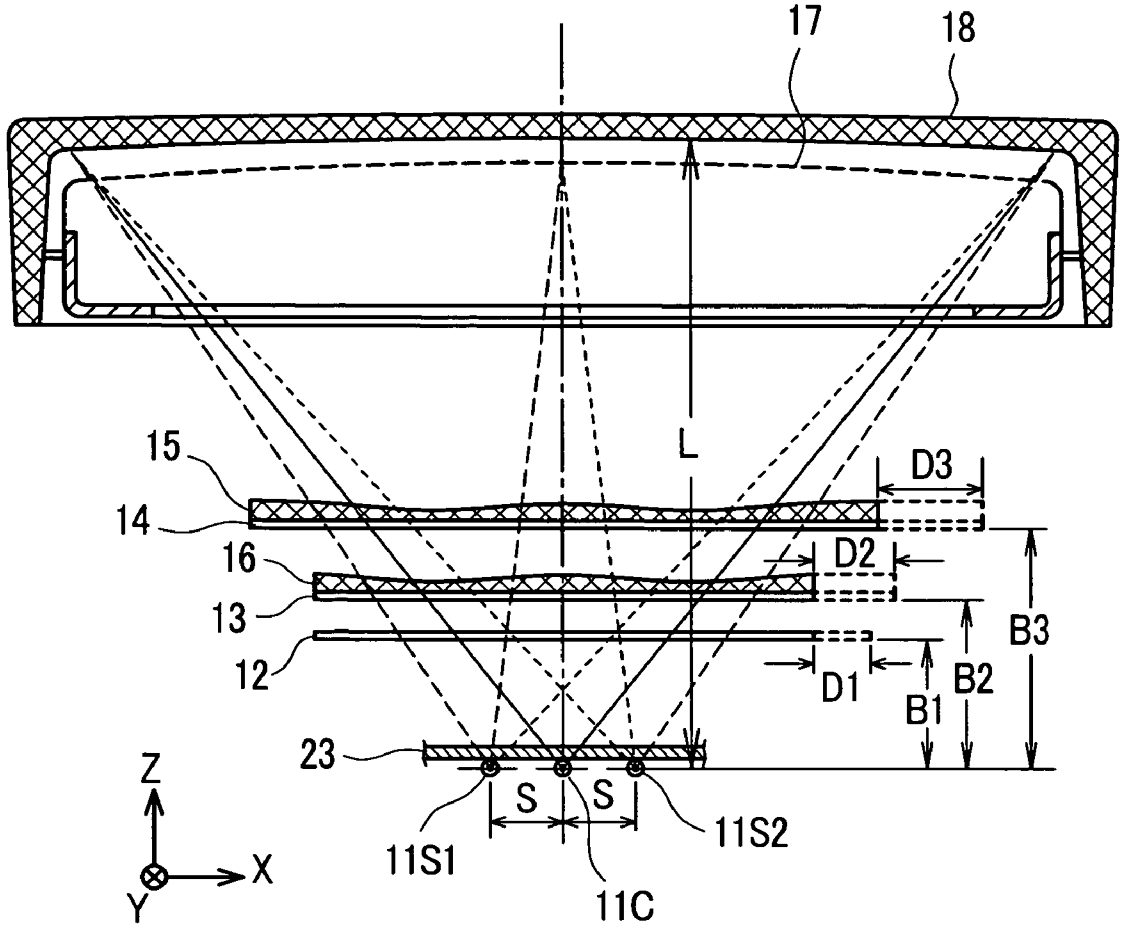
FIG. 7 is a schematic cross-sectional view showing an example of an exposure device used in the manufacture of a color cathode ray tube of an embodiment 2 of the present invention.

FIG. 7 is a schematic cross-sectional view showing an example of an exposure device for explaining the embodiment 2 which is directed to the method for manufacturing the color cathode ray tube of the present invention, wherein parts identical with the parts shown in the above-mentioned drawings are given the same symbols. In FIG. 7, in performing the exposure of a flat-face-type panel portion 18 which has an approximately flat outer surface and has a larger wall thickness at a peripheral portion thereof compared to a wall thickness of a center portion thereof, a distance between the light source 11 and the inner surface of the panel portion 18 at the time of performing the exposure is set to a distance L. With respect to the respective correction filters, a grading filter 12, a monochroic local correction filter 13 and a multi-color local correction filter 14 are arranged in order toward the panel side from the light source 11 side. A distance between the grading filter 12 and the light source 11 is set to B1, the distance between the monochroic local correction filter 13 and the light source 11 is set to B2 and the distance between the multi-color local correction filter 14 and the light source 11 is set to B3.

Figure 12:
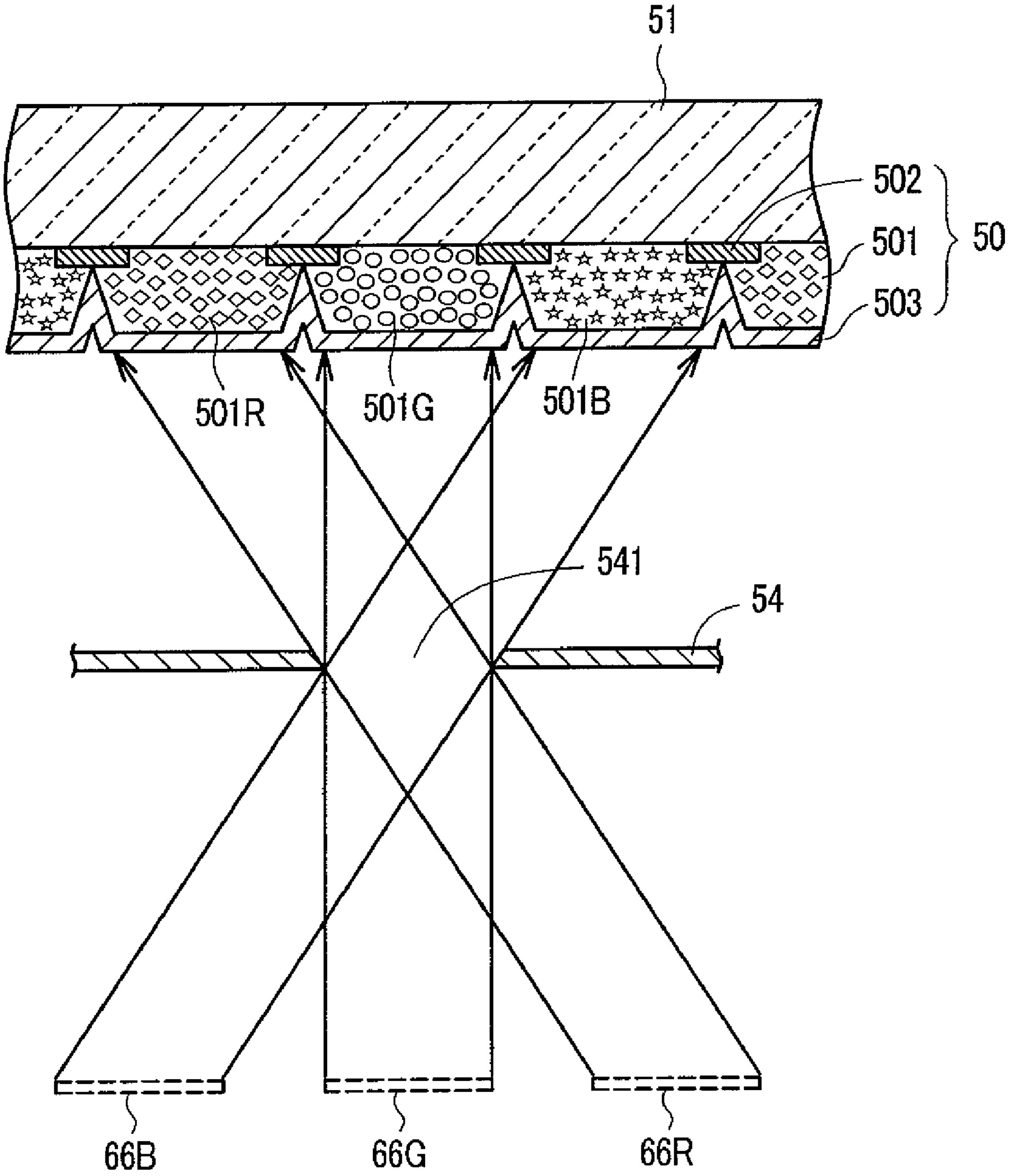
FIG. 12 (Prior Art)
FIG. 12 is an enlarged cross-sectional view of an essential part in FIG. 11.
Figure 13:
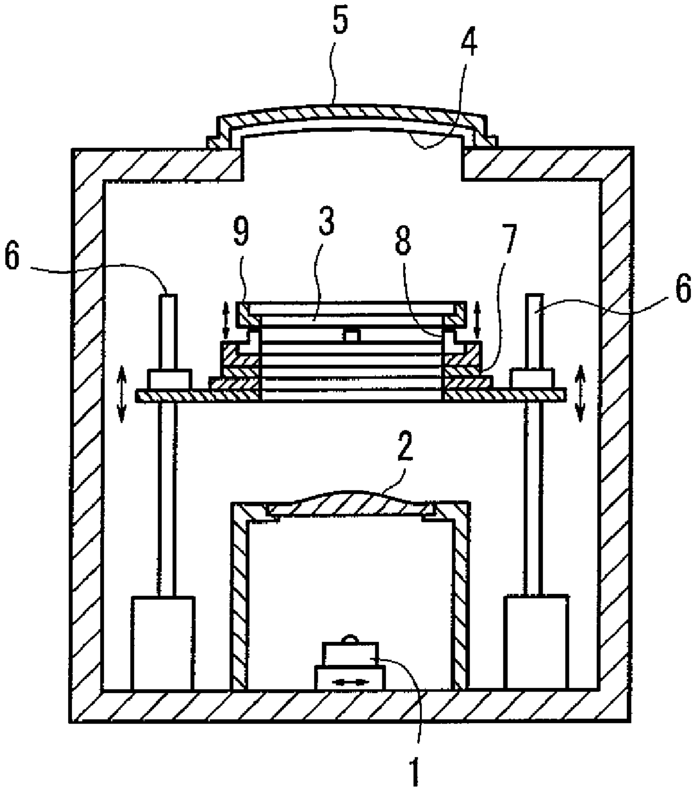
FIG. 13 (Prior Art)
FIG. 13 is a schematic cross-sectional view showing an example of a conventional exposure device.
Figure 14:
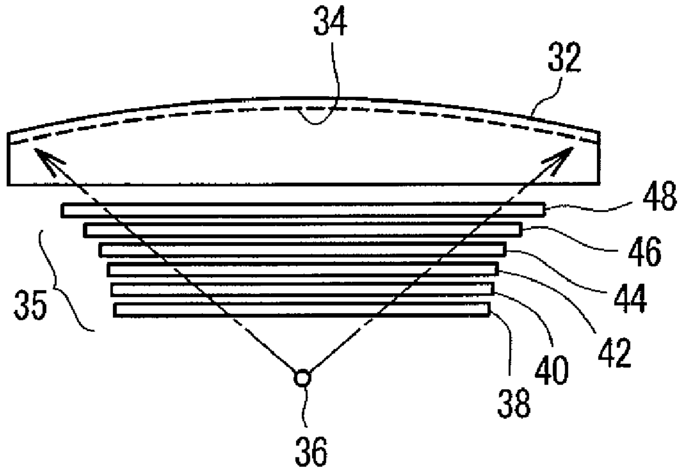
FIG. 14 (Prior Art)
FIG. 14 is a schematic view showing a conventional phosphor screen forming exposure method.

As shown in FIG. 12, the electron beams and the light irradiated from the exposure light source have irradiation positions thereof determined using the shadow mask as the reference. A distance between the shadow mask and the inner surface of the panel can be ignored since the distance is a sufficiently small value compared to the distance between the center of reflection of the electron beams and the inner surface of the panel or the distance L between the exposure light source and the inner surface of the panel. Accordingly, in this embodiment, the distance L between the center of the panel and the light source is used.

In the exposure step, particularly in the side-beam exposure, the side-beam exposure light sources 11S1 and 11S2 are set at positions spaced apart from the center-beam light source 11C by a size S. Accordingly, when the side-beam exposure light source is used, the exposure is performed by displacing the grading filter 12, the monochroic local correction filter 13 and the multi-color local correction filter 14 in the X direction by given sizes substantially parallel to the inner surface of the panel portion 18 respectively, thus aligning the center of the panel and the center of the filter.

Displacement D1 of grading filter 12=S×(L−B1)L

Displacement D2 of monochroic local correction filter 13=S×(L−B2)/L

Displacement D3 of multi-color local correction filter 14=S×(L−B3)/L It is needless to say that the displacement directions become opposite to each other with respect to both side-beam exposure light sources 11S1, 11S2. A cam system, a pulse motor system or the like can be used as a displacement mechanism. Further, numeral 23 indicates a glass plate attached to the light source device.

In this embodiment, the distance S between the light sources assumes a largest value, while the closer the filter is arranged with respect to the panel, the displacement of the filter is decreased. That is, a relationship S>D1>D2>D3 is established.

According to the constitution of the embodiment 2, by performing the exposure in a state that the correction filter and the light source are displaced from each other in a relative manner, the centering in the respective exposures of three colors is facilitated and hence, the fluctuation of the exposure pattern can be suppressed whereby the color cathode ray tube which exhibits the excellent white uniformity while eliminating the difference in emitted light brightness among three colors can be manufactured.

Embodiment 3

Figure 8:
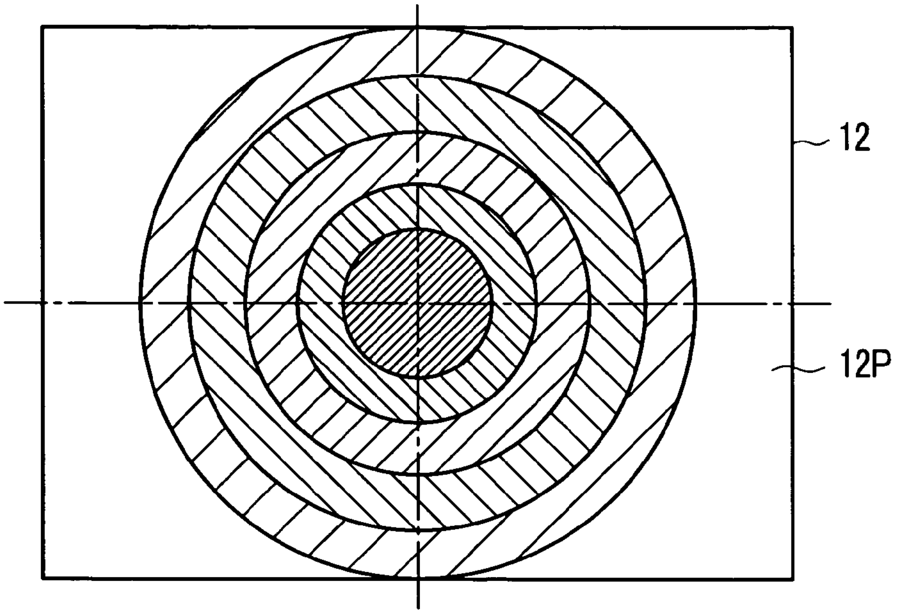
FIG. 8 is a schematic plan view of a grading filter of an embodiment 3 of the present invention.
Figure 9:
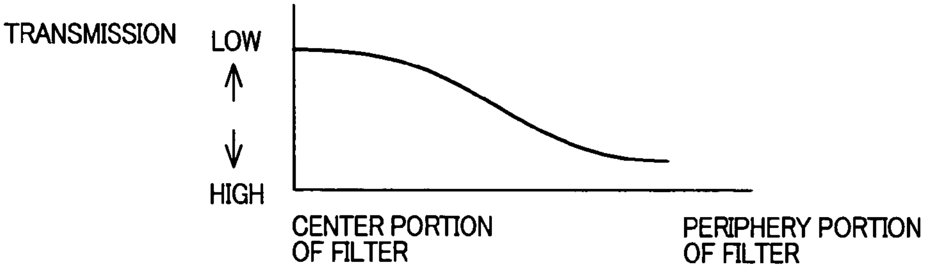
FIG. 9 is an optical transmissivity characteristic diagram of the grading filter shown in FIG. 8.
Figure 10:
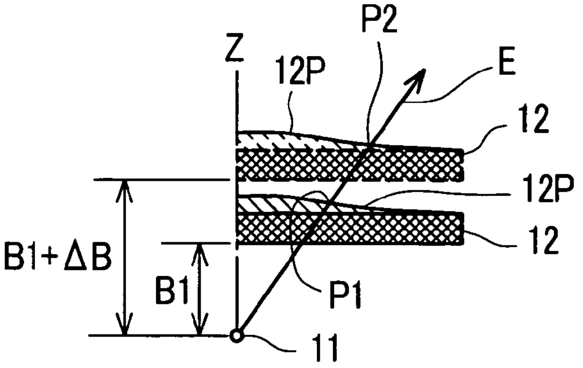
FIG. 10 is a schematic cross-sectional view of an exposure device for explaining an embodiment 3 showing a method for manufacturing a color cathode ray tube of the present invention.
Figure 11:
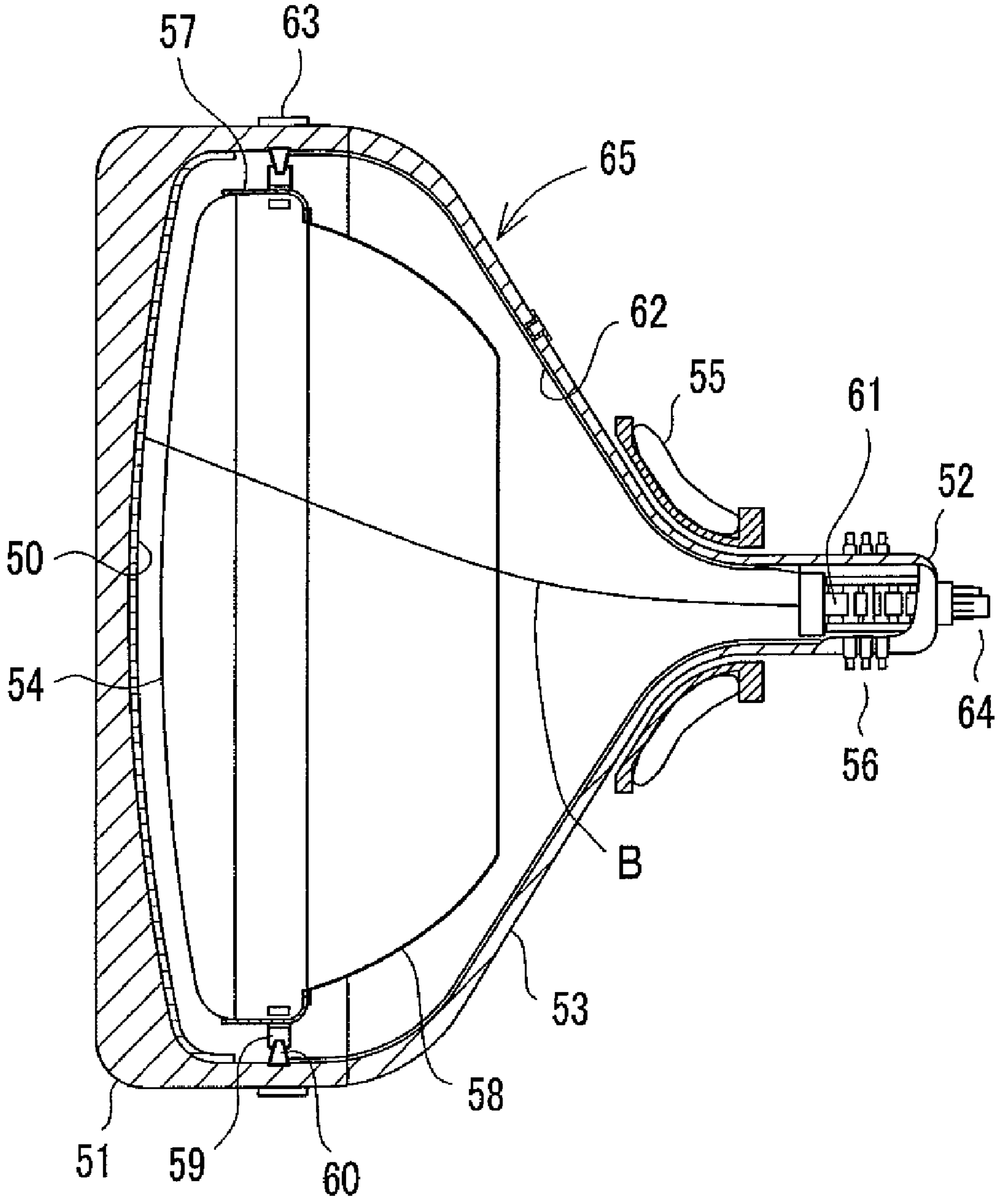
FIG. 11 (Prior Art)
FIG. 11 is a schematic constitutional view for explaining the structure of a flat-face-type shadow-mask color cathode ray tube.

FIG. 8 to FIG. 10 are views for explaining the manufacturing method of the color cathode ray tube of the present invention, wherein FIG. 8 is a schematic plan view of the grading filter, FIG. 9 is a transmissivity characteristic diagram of the grading filter shown in FIG. 8, and FIG. 10 is a schematic cross-sectional view of the exposure device for explaining a relationship between the displacement of the grading filter and the change of optical transmissivity, wherein parts identical with the parts shown in the above-mentioned drawings are the given same symbols in these respective drawings.

The optical transmissivity characteristic of the grading filter 12 possesses, as in the case of an example shown in FIG. 9, an approximately concentric pattern 12*p* in which the optical transmissivity at a center portion exhibits the lowest value and the optical transmissivity is increased toward a peripheral portion. The grading filter 12 is arranged in a spaced apart manner from the light source 11 by a distance B1 in the direction parallel to the tube axis (Z axis).

This embodiment adopts the exposure device in which the positional correlation between the light source 11 and the grading filter 12 is maintained. The exposure is performed by displacing the grading filter 12 within a range of B1 to B1+ΔB1. Although a value of ΔB1 may be selectively set to various sizes depending on a panel size, the value of ΔB1 is practically approximately 10% to 70% of the size of B1.

According to this exposure method, in a state that the displacement is B1+ΔB1, the light E emitted from the light source 11 passes a point P2 where the optical transmissivity is high from a point P1 of the pattern 12*p* and hence, it is possible to control the exposure light quantity of the surface to be exposed.

According to the constitution of the embodiment 3, by changing the distance between the grading filter 12 and the light source 11 within the range of B1 to B1+ΔB1, the fluctuation of the exposure pattern can be suppressed over the whole inner surface of the panel whereby the color cathode ray tube which exhibits the excellent white uniformity while eliminating the emitted light brightness difference among three colors can be manufactured.

The present invention is not limited to the above-mentioned embodiments and various modifications can be made without departing from the technical concept of the present invention.

What is claimed is:

1. A manufacturing method of a color cathode ray tube comprising a panel portion which includes a phosphor screen on which a black matrix film having a plurality of opening portions and three kinds of phosphor pixels which are arranged in the opening portions of the black matrix film are formed on an inner surface thereof, and a shadow mask which is arranged to face the phosphor screen formed on the inner surface of the panel portion and includes a large number of electron beam passing apertures, wherein a step for forming the black matrix film comprises an exposure step of first phosphor pixel holes, an exposure step of second phosphor pixel holes, and an exposure step of third phosphor pixel holes, the exposure step of the first phosphor pixel holes performs the exposure by arranging a grading filter between the inner surface of the panel portion and an exposure light source with a first distance spaced apart from the exposure light source, the exposure step of the second phosphor pixel holes performs the exposure by arranging the grading filter between the inner surface of the panel portion and the exposure light source with a second distance spaced apart from the exposure light source, the exposure step of the third phosphor pixel holes performs the exposure by arranging the grading filter between the inner surface of the panel portion and the exposure light source with a third distance spaced apart from the exposure light source, and at least one of the first distance, the second distance and the third distance is made different from other distance.

2. A manufacturing method of a color cathode ray tube according to claim 1, wherein the third distance differs from the first distance or the second distance.

3. A manufacturing method of a color cathode ray tube according to claim 1 or claim 2, wherein the step for forming the black matrix film exposes holes for green phosphor pixels in the exposure step of first phosphor pixel holes, exposes holes for blue phosphor pixels in the exposure step of second phosphor pixel holes, and exposes holes for red phosphor pixels in the exposure step of third phosphor pixel holes.

4. A manufacturing method of a color cathode ray tube comprising a panel portion which includes a phosphor screen on which a black matrix film having a plurality of opening portions and three kinds of phosphor pixels which are arranged in the opening portions of the black matrix film are formed on an inner surface thereof, and a shadow mask which is arranged to face the phosphor screen formed on the inner surface of the panel portion and includes a large number of electron beam passing apertures, wherein a step for forming the black matrix film comprises an exposure step of first phosphor pixel holes, an exposure step of second phosphor pixel holes, and an exposure step of third phosphor pixel holes, the exposure step of the first phosphor pixel holes performs the exposure by arranging the center of an exposure light source on a panel axis which passes a center portion of the panel portion perpendicular to a surface of the panel portion and by arranging a correction lens and a grading filter between the panel portion and the exposure light source, and the exposure step of the second phosphor pixel holes and the exposure step of the third phosphor pixel holes perform the exposure by establishing a following relationship, wherein S is a distance between the panel axis and the center of the exposure light source, D is a distance between the panel axis and the center of the correction lens or the center of the grading filter, L is a distance between the panel portion and the exposure light source when the exposure light source is arranged on the panel axis, and B is a distance between the center of the light source and the correction lens or the grading filter in a state that the center of the exposure light source is displaced from the panel axis in the horizontal direction $$D=S\times(L-B)/L, \text{ where } L\neq 0.$$

5. A manufacturing method of a color cathode ray tube comprising a panel portion which includes a phosphor screen on which a black matrix film having a plurality of opening portions and three kinds of phosphor pixels which are arranged in the opening portions of the black matrix film are formed on an inner surface thereof, and a shadow mask which is arranged to face the phosphor screen formed on the inner surface of the panel portion and includes a large number of electron beam passing apertures, wherein the panel portion includes a long axis in the X-axis direction and a short axis in the Y-axis direction, a step for forming the black matrix film comprises an exposure step of first phosphor pixel holes, an exposure step of second phosphor pixel holes, and an exposure step of third phosphor pixel holes, in the exposure step of first phosphor pixel holes, the exposure step of second phosphor pixel holes, and the exposure step of third phosphor pixel holes, a grading filter and a multi-color local correction filter are arranged between the panel portion and an exposure light source, the exposure light source differs a position thereof in the X-axis direction for every exposure step, and a center position of the grading filter and a center position of the multi-color local correction filter in the respective exposure steps are disposed on a line which connects a center of the inner surface of the panel portion and a center of the exposure light source.

6. A manufacturing method of a color cathode ray tube according to claim 5, wherein in the exposure step of first phosphor pixel holes, a first phosphor pixel local correction filter is arranged between the panel portion and the exposure light source, and the center position of the first phosphor pixel local correction filter is disposed on a line which connects the center of the inner surface of the panel portion and the center of the exposure light source.

7. A manufacturing method of a color cathode ray tube according to claim 5, wherein in the exposure step of second phosphor pixel holes, a second phosphor pixel local correction filter is arranged between the panel portion and the exposure light source, and the center position of the second phosphor pixel local correction filter is disposed on a line which connects the center of the inner surface of the panel portion and the center of the exposure light source.

8. A manufacturing method of a color cathode ray tube according to claim 5, wherein in the exposure step of third phosphor pixel holes, a third phosphor pixel local correction filter is arranged between the panel portion and the exposure light source, and the center position of the third phosphor pixel local correction filter is disposed on a line which connects the center of the inner surface of the panel portion and the center of the exposure light source.

* * * * *